United States Patent [19]

Tsuji et al.

[11] Patent Number: 5,461,500
[45] Date of Patent: Oct. 24, 1995

[54] POLARIZATION CONVERTING APPARATUS AND OPTICAL INSTRUMENT HAVING THE SAME

[75] Inventors: Sadahiko Tsuji, Yokohama; Hidetoshi Suzuki, Atsugi; Hideaki Mitsutake, Tokyo; Katsumi Kurematsu, Kawasaki; Noritaka Mochizuki, Yokohama; Nobuo Minoura, Yokohama; Shigeru Kawasaki, Atsugi; Kazumi Kimura, Atsugi; Junko Shingaki, Atsugi, all of Japan

[73] Assignee: Canon Kabushiki Kaisha, Tokyo, Japan

[21] Appl. No.: 293,738

[22] Filed: Aug. 22, 1994

Related U.S. Application Data

[63] Continuation of Ser. No. 41,286, Mar. 29, 1993, abandoned, which is a continuation of Ser. No. 696,725, May 7, 1991, abandoned.

[30] Foreign Application Priority Data

| May 8, 1990 | [JP] | Japan | 2-116728 |
| Jul. 3, 1990 | [JP] | Japan | 2-174442 |
| Nov. 19, 1990 | [JP] | Japan | 2-313597 |

[51] Int. Cl.⁶ ............ G02B 5/30; G02B 27/28; G02F 1/1335
[52] U.S. Cl. ............ 359/48; 359/49; 359/70; 359/495; 359/499
[58] Field of Search ............ 359/70, 487, 500, 359/858, 859, 48, 49, 50, 495, 499; 313/112, 114

[56] References Cited

U.S. PATENT DOCUMENTS

| 1,223,752 | 4/1917 | Adams . | |
| 1,503,766 | 8/1924 | Pictet et al. | 359/487 |
| 1,717,360 | 6/1929 | Anderson, Jr. et al. | 359/487 |
| 2,272,186 | 2/1942 | Creehan . | |
| 2,887,566 | 5/1959 | Marks | 359/487 |
| 3,508,809 | 4/1970 | Wilder et al. | 359/495 |
| 3,566,099 | 2/1971 | Makas | 359/487 |
| 4,334,734 | 6/1982 | Harene et al. | 359/70 |
| 4,525,413 | 6/1985 | Rogers et al. | 359/500 |
| 4,560,999 | 12/1985 | Tokuhara . | |
| 4,660,936 | 4/1987 | Nosker | 359/70 |
| 4,864,390 | 9/1989 | McKechnie et al. . | |
| 4,936,659 | 6/1990 | Anderson et al. | 359/70 |
| 4,973,139 | 11/1990 | Weinhrauch et al. | 359/70 |
| 4,989,076 | 1/1991 | Owada et al. . | |
| 5,042,921 | 8/1991 | Sato et al. | 359/70 |
| 5,122,895 | 6/1992 | Takanashi et al. | 359/247 |
| 5,123,729 | 6/1992 | Kondo et al. | 359/49 |
| 5,142,387 | 8/1992 | Shikana et al. | 359/49 |
| 5,146,248 | 9/1992 | Dowaer et al. | 359/49 |
| 5,164,854 | 11/1992 | Takanashi et al. | 359/495 |

FOREIGN PATENT DOCUMENTS

| 0322070 | 6/1989 | European Pat. Off. . |
| 711306 | 9/1931 | France . |
| 1058232 | 3/1954 | France . |
| 2007195 | 1/1970 | France . |
| 554927 | 11/1929 | Germany . |
| 690467 | 4/1953 | United Kingdom . |
| 2016735 | 9/1979 | United Kingdom . |

OTHER PUBLICATIONS

Patent Abstracts of Japan, vol. 7, No. 156 (P–209) (1301), JP 058–66909 (Fujitsu) 8, Aug. 1983.

Elmer, William B, "The Optical Design of Reflectors", Wiley, 1980, pp. 160–165.

Primary Examiner—Martin Lerner
Attorney, Agent, or Firm—Morgan & Finnegan

[57] ABSTRACT

This specification discloses a polarization converting apparatus having means emitting non-polarized light, and polarizing means having a light incidence surface and a light emergence surface, the polarizing means receiving the non-polarized light by the light incidence surface and causing polarized light to emerge from the light emergence surface, the size and shape of the light incidence surface being similar to the size and cross-sectional shape of the non-polarized light. The specification also discloses an optical instrument having such apparatus.

8 Claims, 11 Drawing Sheets

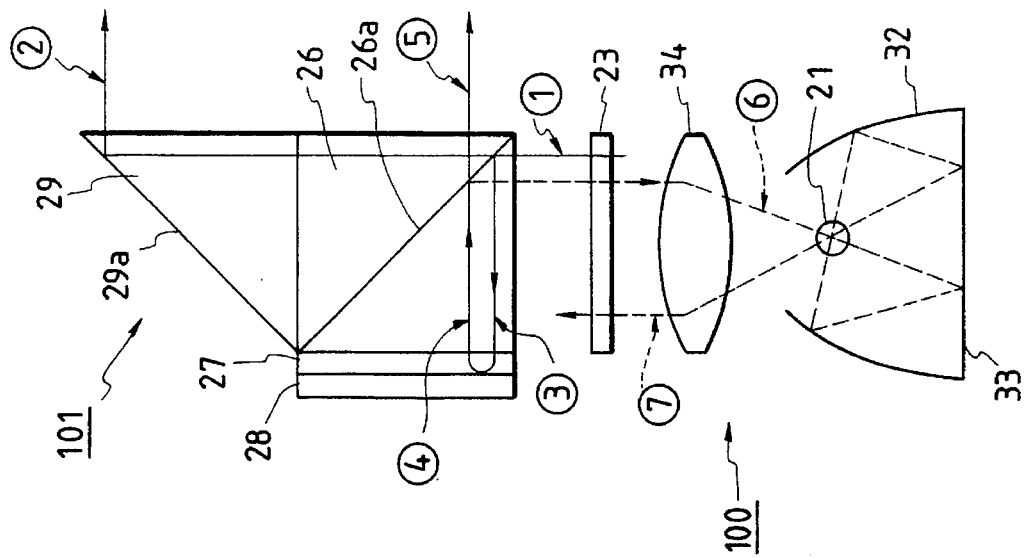
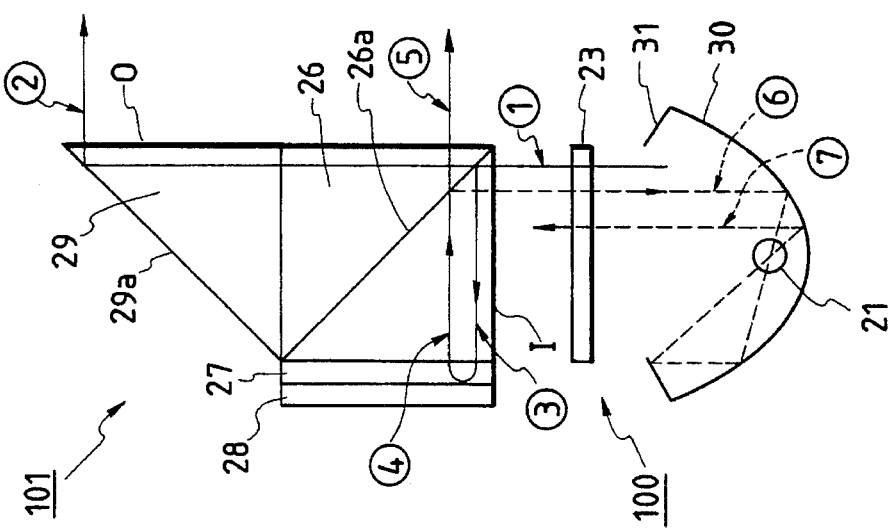

POLARIZATION CONVERTING APPARATUS AND OPTICAL INSTRUMENT HAVING THE SAME

This application is a continuation of application Ser. No. 08/041,286, filed Mar. 29, 1993 (now abandoned), which is a continuation of application Ser. No. 07/696,725, filed May 7, 1991 (now abandoned).

BACKGROUND OF THE INVENTION

FIELD OF THE INVENTION

This invention relates to a polarization converting apparatus and an optical instrument such as a projector having the same.

There is known a polarization converting apparatus for converting non-polarized light into rectilinearly polarized light, circularly polarized light or the like while minimizing the loss of the quantity of light.

Such polarization converting apparatus is disclosed in the applicant's U.S. Pat. No. 4,560,999, U.S. Pat. No. 4,989,076, and U.S. Pat. No. 4,864,390, Japanese Laid-Open Pat. Application No. 61-90584 etc. The apparatus disclosed in these publications is such that light from a light source comprising an arrangement of a lamp and a mirror and/or a lens is divided by a polarizing beam splitter into two polarized beams whose planes of polarization are orthogonal to each other, whereafter the plane of polarization of one of the polarized beams is rotated so that the plane of polarization of said one polarized beam may coincide with the plane of polarization of the other polarized beam, and in this manner, the non-polarized light from the light source is efficiently converted into rectilinearly polarized light.

However, in this apparatus, the polarizing beam splitter comprises a cube comprising square plates or prisms stuck together and therefore, the light incidence surface thereof is rectangular and part of a light beam usually of circular cross-sectional shape from the light source has been eclipsed by the light incidence surface. The quantity of the light eclipsed by this light incidence surface is not negligibly small. Accordingly, the prior-art polarization converting apparatus could not be said to achieve its purpose sufficiently.

SUMMARY OF THE INVENTION

The present invention has been made in view of the above-noted problem peculiar to the prior art, and an object thereof is to provide an improved polarization converting apparatus of high light utilization efficiency and an improved optical instrument such as a projector of high light utilization efficiency.

The apparatus of the present invention in its first form has means emitting non-polarized light, and polarizing means for receiving said non-polarized light by a light incidence surface and causing polarized light to emerge from a light emergence surface, the shape of said light incidence surface being similar to the cross-sectional shape of said non-polarized light.

The apparatus of the present invention in its second form has means emitting non-polarized light, and polarizing means for receiving said non-polarized light by a light incidence surface and causing polarized light to emerge from a light emergence surface, the size and shape of said light incidence surface being similar to the size and cross-sectional shape of said non-polarized light.

The apparatus of the present invention in its third form has polarizing means for converting light incident on a light incidence surface into polarized light and causing it to emerge from a light emergence surface, and directing means for directing to said polarizing means light having a size and a cross-sectional shape similar to the size and shape of said light incidence surface.

The apparatus of the present invention in its fourth form has polarizing means for converting light incident on a light incidence surface into polarized light and causing it to emerge from a light emergence surface, directing means for directing to said polarizing means light having a cross-sectional shape similar to the shape of said light incidence surface, and means for modulating said polarized light from said polarizing means and forming an image.

The apparatus of the present invention in its fifth form has polarizing means for converting light incident on a light incidence surface into polarized light and causing it to emerge from a light emergence surface, directing means for directing to said polarizing means light having a size and a cross-sectional shape similar to the size and shape of said light incidence surface, generating means for modulating said polarized light from said polarizing means and generating an image, and an optical system for projecting said image.

Said polarizing means which constitutes the apparatus of the present invention may assume a form comprising a polarizing plate or a polarizing beam splitter, or a form having means for dividing non-polarized light into first and second polarized lights whose planes of polarization are orthogonal to each other and means for making the planes of polarization of said first and second polarized lights coincident with each other.

A preferred form of the apparatus of the present invention is such that the shape of the light incidence surface of said polarizing means is set to a substantially rectangular shape, said directing means has a lamp and a reflector for reflecting the light emitted by said lamp and directing it to said polarizing means, the shape of an opening in said reflector which faces said polarizing means is rectangular, and said reflector reflects the light emitted by said lamp so that the light emitted by said lamp may pass through said opening.

There is also a form in which said reflector has a first parabolic surface mirror and a second parabolic surface mirror formed with said opening, said first and second parabolic surface mirrors being disposed in face-to-face relationship with each other so that with their focuses made substantially coincident with each other, said second parabolic surface mirror may be on said polarizing means side, and said lamp is placed on said focuses.

There is also a form in which said reflector has a plane mirror and an elliptical mirror formed with said opening near the focus thereof, said plane mirror and said elliptical mirror being disposed in face-to-face relationship with each other so that said elliptical mirror may be on said polarizing means side, and said lamp is placed on said focus.

There is also a form in which said reflector has a parabolic surface mirror and a spherical mirror formed with said opening, said parabolic surface mirror and said spherical mirror being disposed in face-to-face relationship with each other so that with the focus of said parabolic surface mirror and the center of the sphere of said spherical mirror made substantially coincident with each other, said spherical mirror may be on said polarizing means side, and said lamp is placed on said focus.

There is also a form in which said reflector has an elliptical mirror and a spherical mirror formed with said opening, said elliptical mirror and said spherical mirror being disposed in face-to-face relationship with each other so that with the focus of said elliptical mirror and the center of the sphere of said spherical mirror made substantially coincident with each other, said spherical mirror may be on said polarizing means side, and said lamp is placed on said focus.

The image generating means used in the apparatus of the present invention may be various light valves designed to modulate polarized light, such as light valves utilizing TN liquid crystal.

The idea of the present invention is applied to various display instruments and recording instruments using these light bulbs, and provides an improved video projector, an improved flat display panel, an improved printer or the like. The application of the present invention to other optical apparatus utilizing a polarized beam than display instruments is also possible.

BRIEF DESCRIPTION OF THE DRAWINGS

FIGS. 8 and 9 show preferred embodiments of the present invention.

DESCRIPTION OF THE PREFERRED EMBODIMENTS

Some embodiments of the present invention will hereinafter be described with reference to the drawings.

Figure 2:
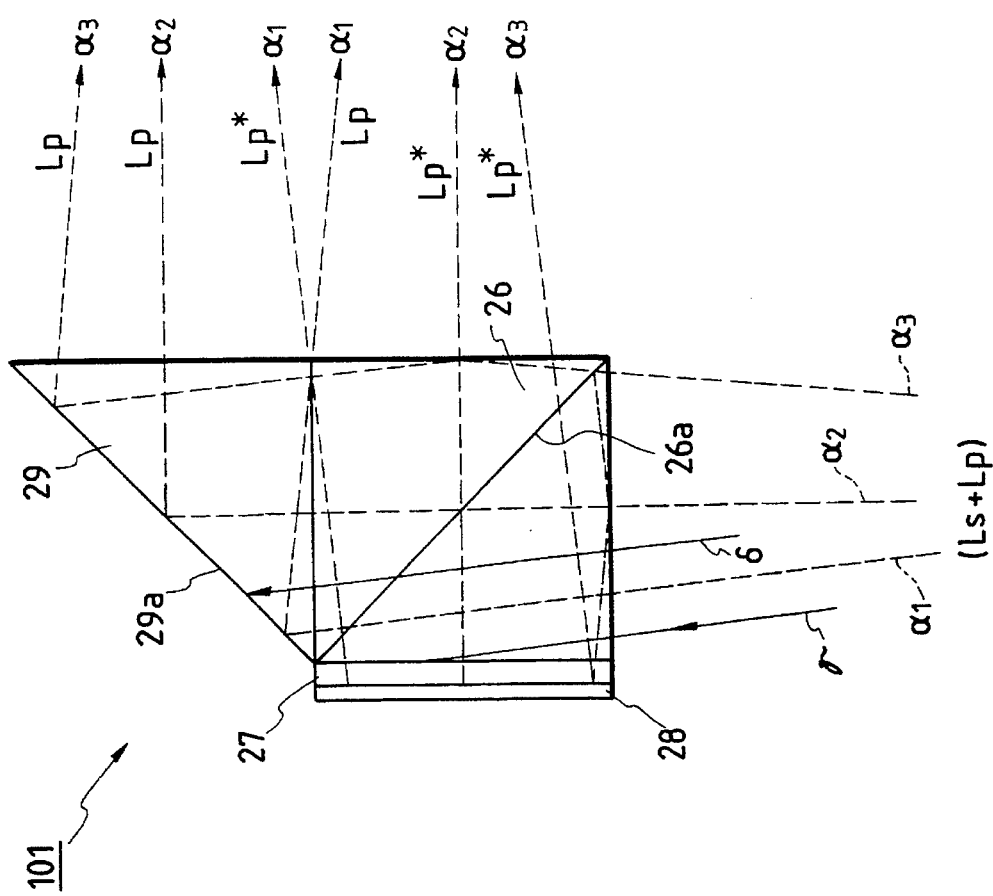
FIG. 2 illustrates an optical path in the polarization illuminating apparatus of FIG. 1.
Figure 1:
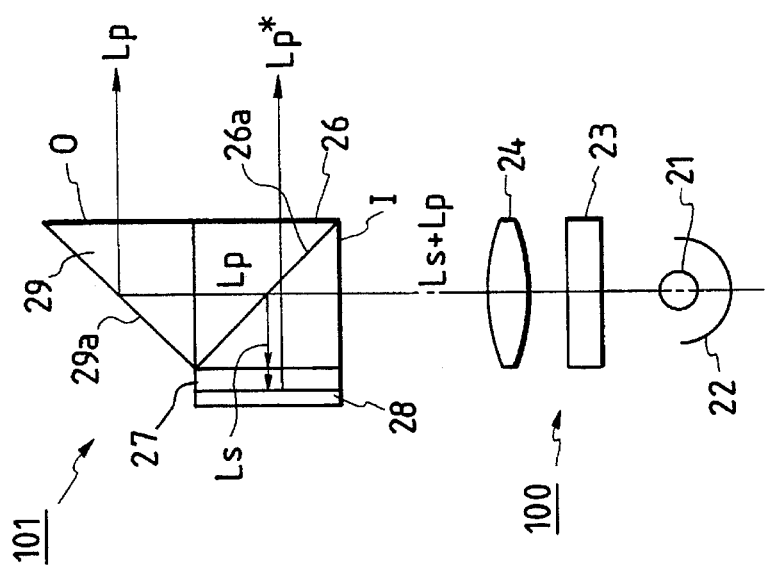
FIG. 1 shows the construction of a first embodiment of the polarization illuminating apparatus of the present invention.

FIG. 1 shows the construction of an embodiment of the polarization illuminating apparatus of the present invention, and FIG. 2 illustrates an optical path in the polarizing apparatus 101 of FIG. 1.

This polarizing apparatus 101 is comprised of a polarizing beam splitter 26 having an acting surface (deposited film formed on an inclined surface on which two rectangular prisms are adhesively secured to each other) 26a transmitting therethrough the P-polarized component Lp of a parallel light beam emitted from the condenser lens 24 of an illuminating system 100 and reflecting the S-polarized component Ls of said parallel light beam at a right angle, a total reflection prism 29 having one end thereof in contact with one end of the acting surface 26a of the polarizing beam splitter 26 perpendicularly thereto and having a total reflection surface 29a for reflecting said transmitted P-polarized component Lp at a right angle, a quarter wavelength optical phase plate 27 having one end thereof in contact with one end of the acting surface 26a of the polarizing beam splitter 26 at an angle of 45° and in contact with one end of the total reflection surface 29a of the total reflection prism 29 and on which said reflected S-polarized component $L_S$ is incident, and a reflecting plate 28 having a reflecting surface comprising aluminum deposited film or optical multilayer film adhesively secured to the quarter wavelength optical phase plate 27.

In this apparatus, a reflecting mirror 22 comprises a spherical mirror, and the center of the curvature thereof is coincident with the center of a light source 21 comprising a lamp, and the focus position of the condenser lens 24 is coincident with the center of the light source 21. The parallel light beam emitted from the condenser lens 24 is incident on the light incidence surface I of the apparatus 101, and the P-polarized component Lp thereof is transmitted through the acting surface 26a of the polarizing beam splitter 26 and the S-polarized component Ls thereof is reflected at a right angle by the acting surface 26a, whereby the light beam is separated into the P-polarized component and the S-polarized component. Said reflected S-polarized component Ls is incident on the quarter wavelength optical phase plate 27, is reflected by the reflecting surface of the reflecting plate 28 and is again transmitted through the quarter wavelength optical phase plate 27, whereby the S-polarized component Ls has its plane of polarization rotated by 90° and is converted into P-polarized component Lp*. This P-polarized component Lp* is intactly transmitted through the acting surface 26a and emerges from the polarizing beam splitter 26. On the other hand, said transmitted P-polarized component Lp is reflected at a right angle by the total reflection surface 29a of the total reflection prism 29, and emerges from the total reflection prism 29 in parallelism to said P-polarized component Lp*.

Accordingly, in this polarization illuminating apparatus, as indicated by light rays $\alpha_1$, $\alpha_2$ and $\alpha_3$ in FIG. 2, the light beam incident on the polarizing beam splitter 26 is incident on the acting surface 26a of the polarizing beam splitter 26 without fail and therefore, all light beams are separated into the P-polarized component Lp and the S-polarized component Ls. Moreover, the S-polarized component Ls is incident on the quarter wavelength optical phase plate 27 without fail and therefore, the plane of polarization thereof is rotated without fail. Conversely, the P-polarized component Lp is never incident on the quarter wavelength optical phase plate 27. Also, with respect to a light ray, the P-polarized component Lp emerging from the total reflection prism 29 and the P-polarized component Lp* emerging from the polarizing beam splitter 26 become vertically symmetrical with each other. Therefore, even if unbalance is caused in the intensity distribution of the incident light beam onto the polarizing beam splitter 26 by the deviation or the like of the disposition of the light source 21, the intensity of illumination can be prevented from sharply varying in the junction between the P-polarized component Lp emerging from the light emergence surface 0 of the apparatus 101 and said converted P-polarized component Lp*. Further, the lengths of the optical paths of said emerging P-polarized component Lp and said converted P-polarized component Lp* are equal to each other and therefore, the creation of any unbalance of the intensity of illumination when non-collimated light is used can be prevented. This is because the acting surface 26a of the polarizing beam splitter 26, the quarter wavelength optical phase plate 27 and the total reflection surface 29a of the total reflection prism 29 are designed to contact with one another at a predetermined angle.

Also, in this polarizing apparatus 101, for a light ray like a light ray γ shown in FIG. 2, where the incident light beam onto the polarizing beam splitter 26 is obliquely incident on the quarter wavelength optical phase plate 27, the light beam may be transmitted through or absorbed by the quarter wavelength optical phase plate 27, thus resulting in a loss of the quantity of light, but this can be prevented by forming optical multilayer film reflecting a light ray of great angle of incidence like the light ray γ and transmitting therethrough normal light of small angle of incidence on the joined surface of the polarizing beam Splitter 26 and the quarter wavelength phase plate 27.

Further, for a light ray like a light ray δ shown in FIG. 2, where the light beam is incident on the total reflection surface 29a of the total reflection prism 29 at an angle smaller than the angle of total reflection, part of the light beam is transmitted, whereby a loss of the quantity of light is caused in said P-polarized component Lp, but again, such loss can be prevented by forming reflecting optical multilayer film or metallic reflecting film on the total reflection surface 29a.

As described above, in this polarization illuminating apparatus, both of the P-polarized component Lp and the S-polarized component Ls separated by the polarizing beam splitter 26 can be utilized as illuminating light for a liquid crystal light valve, not shown, disposed on the right side of the apparatus 101, and this leads to the improved utilization efficiency of light. Also, in this apparatus, some of the light returns from the polarizing beam splitter 26 to the condenser lens 24 due to the incidence angle dependency and wavelength dependency of the polarizing beam splitter 26 and the quarter wavelength plate 27, but in the present embodiment, the condenser lens 24, the light source 21 and the mirror 22 are disposed as previously described and therefore, the return light can be again directed effectively to the polarizing beam splitter. This effect also occurs in other embodiments described below. Also, the unbalance of the intensities of illumination of the P-polarized component Lp and the converted P-polarized component Lp* which poses a problem when these two components are parallel-applied to the liquid crystal light valve is greatly improved and also, the distance between the polarization illuminating apparatus and the light valve can be shortened and thus, a projection type display apparatus having the polarization illuminating apparatus of the present embodiment can be made compact.

The total reflection prism 29 may be formed integrally with the rectangular prism on that side of the polarizing beam splitter 26 which is adjacent to the total reflection prism 29.

Figure 3:
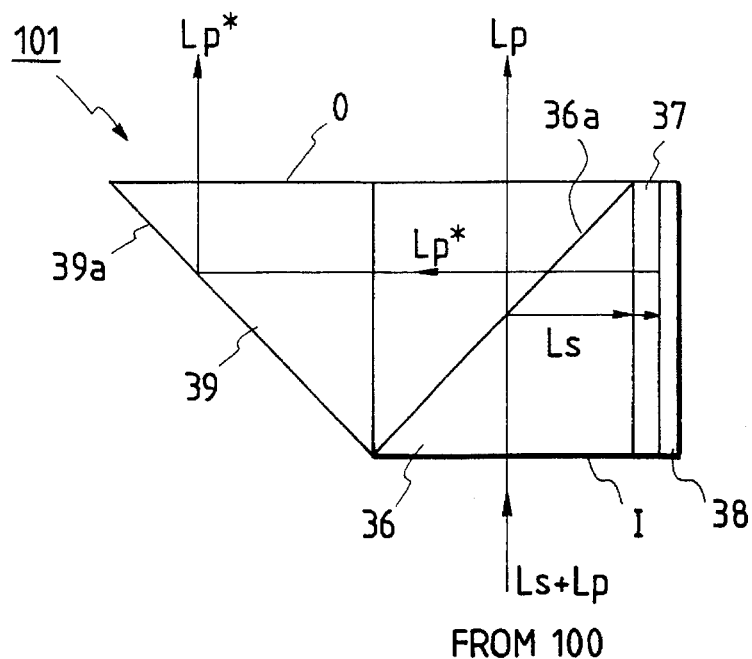
FIG. 3 shows the construction of a second embodiment of the polarization illuminating apparatus of the present invention.

Although the present embodiment uses the polarizing beam splitter 26 comprising a prism and the total reflection prism 29, these may be replaced by a polarizing beam splitter having optical multilayer film formed on a flat plate or a reflecting mirror having metallic thin film formed on a flat plate, whereby the light weight and reduced cost of the apparatus can be achieved. This also holds true of the following embodiments. FIG. 3 shows the construction of a second embodiment of the polarization illuminating apparatus of the present invention, and more particularly an apparatus for illuminating a liquid crystal light valve.

The difference of this polarization illuminating apparatus from that shown in FIG. 1 is that the P-polarized component Lp transmitted through the acting surface 36a of a polarizing beam splitter 36 intactly emerges from the polarizing beam splitter 36 and the S-polarized component Ls reflected by the acting surface 36a is converted into P-polarized component Lp* by a quarter wavelength optical phase plate 37 and a reflecting plate 38, whereafter it is reflected at a right angle by the total reflection surface 39a of a total reflection prism 39 and emerges from the total reflection prism 39 in parallelism to the P-polarized component Lp.

The total reflection prism 39 may be formed integrally with a rectangular prism on that side of the polarizing beam splitter 36 which is adjacent to the total reflection prism 39.

Figure 4:
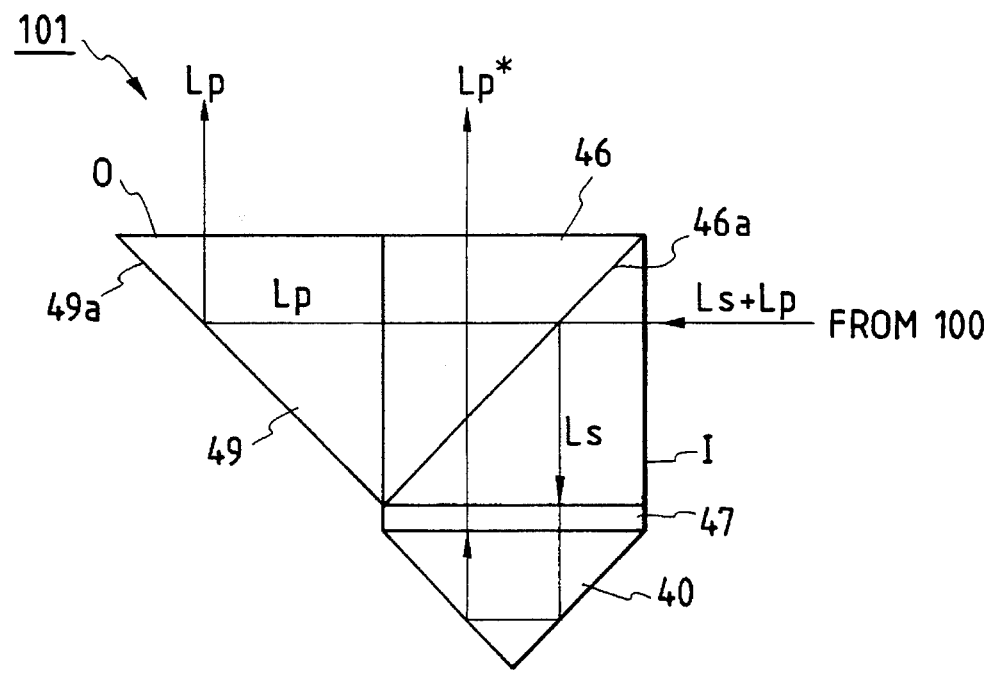
FIG. 4 shows the construction of a third embodiment of the polarization illuminating apparatus of the present invention.

FIG. 4 shows the construction of a third embodiment of the polarization illuminating apparatus of the present invention, and more particularly an apparatus for illuminating a liquid crystal light valve.

This polarization illuminating apparatus uses a rectangular prism 40, instead of the reflecting plate 28 of the polarization illuminating apparatus of FIG. 1, to reflect the S-polarized component Ls reflected by the acting surface 46a of a polarizing beam splitter 46 without creating unnecessary polarized components.

In the present embodiment, the S-polarized component Ls is horizontally inverted and emerges from the rectangular prism 40 to a quarter wavelength optical phase plate 47 and is converted into P-polarized component Lp*.

The total reflection prism 49 may be formed integrally with the rectangular prism on that side of the polarizing beam splitter 46 which is adjacent to the total reflection prism 49.

Figure 5:
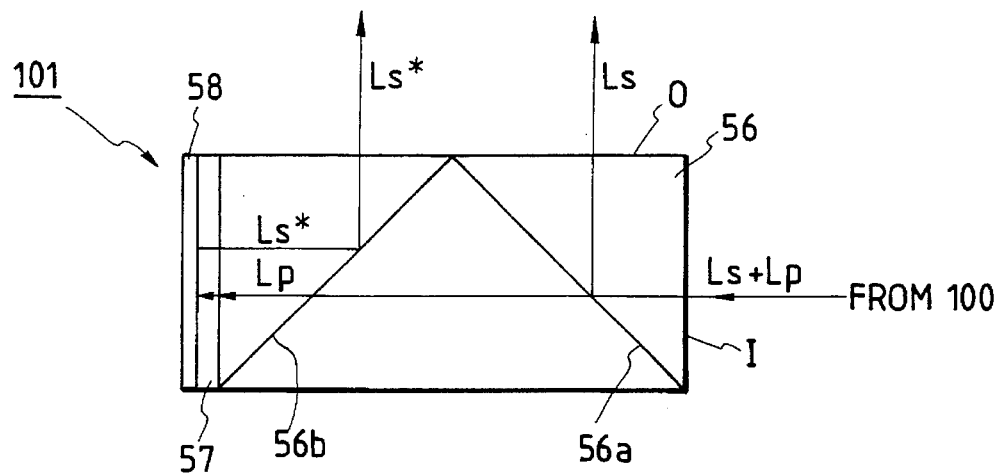
FIG. 5 shows the construction of a fourth embodiment of the polarization illuminating apparatus of the present invention.

FIG. 5 shows the construction of a fourth embodiment of the polarization illuminating apparatus of the present invention, and more particularly an apparatus for illuminating a liquid crystal light valve.

This polarization illuminating apparatus is comprised of a polarizing beam splitter 56 having a first acting surface (deposited film formed on one of two inclined surfaces on which three rectangular prisms are adhesively secured together) 56a transmitting the P-polarized component Lp of the incident light beam therethrough and reflecting the S-polarized component Ls of the incident light beam at a right angle and a similar second acting surface (deposited film formed on the other of said two inclined surfaces) 56b having one end thereof in contact with the first acting surface 56a at a right angle, a quarter wavelength optical phase plate 57 having one end thereof in contact with the other end of the second acting surface 56b at an angle of 45° and adhesively secured to that side of the polarizing beam splitter 56 which is opposite to the incidence surface, and a reflecting plate 58 having a reflecting surface adhesively secured to the quarter wavelength plate 57.

The S-polarized component Ls of the incident light beam from a condenser lens, not shown, is reflected by the first acting surface 56a of the polarizing beam splitter 56 and intactly emerges therefrom. On the other hand, the P-polarized component Lp of said incident light beam is transmitted through the first and second acting surfaces 56a and 56b of the polarizing beam splitter 56 and enters the quarter wavelength optical phase plate 57. This P-polarized component Lp has its plane of polarization rotated by 90° by the quarter wavelength optical phase plate 57 and the reflecting plate 58 and is converted into S-polarized component Ls*, whereafter it is reflected at a right angle by the second acting surface 56b of the polarizing beam splitter 56, and emerges in the same direction as the S-polarized component Ls.

In the present embodiment, the quarter wavelength optical phase plate 57 and the reflecting plate 58 are not disposed on that side of the polarizing beam splitter 56 which is opposite to the emergence side and therefore can be made to operate also as an analyzer (this will be described later in detail).

Description will now be made of an embodiment of a projection type display apparatus in which the polarization illuminating apparatus of the present invention is constructed in combination with other optical parts.

Figure 6:
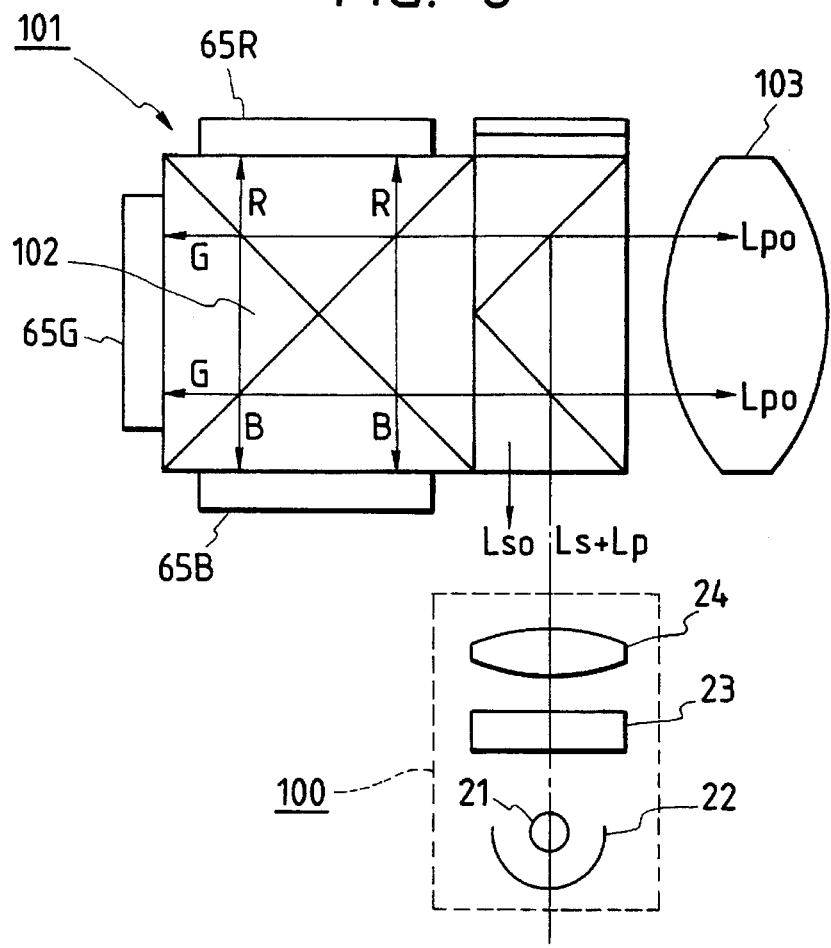
FIG. 6 shows the construction of the essential portions of an embodiment of a projection type display apparatus having the polarization illuminating apparatus shown in FIG. 5.

FIG. 6 shows the construction of the essential portions of an embodiment of a projection type display apparatus having the polarization illuminating apparatus shown in FIG. 5.

This projection type display apparatus, as shown in FIG. 6, has an illuminating system 100 comprising a light source 21, a reflecting mirror 22 comprising a spherical mirror, a heat ray cut filter 23 and a condenser lens 24, the polarizing apparatus 101 shown in FIG. 5, a cross dichroic prism 102 having one surface thereof adhesively secured to the emergence surface of the polarizing apparatus 101 and having reflection type liquid crystal light valves 65R, 65G and 65B for red, green and blue adhesively secured to the other three surfaces thereof, and a projection lens system 103 provided on that side of the polarizing apparatus 101 which is opposite to the emergence surface for projecting an image made by each light valve onto a screen, not shown. Again in this apparatus, the reflecting mirror 22 comprises a spherical mirror, and the center of the curvature thereof coincides with the center of the light source 21, and the condenser lens 24 has the collimating function and the focus position thereof coincides with the center of the light source 21. Accordingly, the light beam from the light source 21 is converted into a parallel light beam by the lens 24.

The S-polarized component Ls of a white parallel light beam emitted from the illuminating system 100 is reflected at a right angle by the first acting surface 56a of the polarizing beam splitter 56 which constitutes the polarizing apparatus 101 (see FIG. 5), and enters the cross dichroic prism 102. Also, the P-polarized component Lp of the white parallel light beam, as previously described, is converted into S-polarized component Ls* by the quarter wavelength optical phase plate 57 and the reflecting plate 58, whereafter it is reflected at a right angle by the second acting surface 56b of the polarizing beam splitter 56 (see FIG. 5) and enters the cross dichroic prism 102. That is, the white parallel light beam is converted by the polarizing apparatus 101 into a rectilinearly polarized light beam comprising S-polarized components Ls and Ls*, and emerges to the cross dichroic prism 102.

This rectilinarly polarized light beam is separated into red, green and blue light beams R, G and B by the cross dichroic prism 102, and the light beams R, G and B are projected onto reflection type liquid crystal light valves 65R, 65G and 65B for red, green and blue, respectively. Liquid crystal used in the reflection type liquid crystal light valves 65R, 65G and 65B is of the ECB (electrically controlled birefringence) type or the 45° TN type, and has the property of rotating the plane of polarization of the incident light by a voltage applied thereto in conformity with an image signal. Accordingly, the incident lights onto the reflection type liquid crystal light valves 65R, 65G and 65B are rectilinearly polarized light beams of S-polarized component, but the reflected lights thereof become light beams having P-polarized component in conformity with the signals of the picture elements of the aforementioned image signal. Said reflected lights are combined together by the cross dichroic prism 102, and thereafter are returned to the polarizing apparatus 101. In the polarizing apparatus 101, the polarizing beam splitter 56 (see FIG. 5) acts as an analyzer, which transmits the P-polarized component Lpø of the combined reflected light therethrough and projects an image an image light onto the screen, not shown, through the lens system 103. On the other hand, part of the S-polarized component Lsø of the combined reflected light which enters the first acting surface 56a of the polarizing beam splitter 56 is reflected at a right angle by the first acting surface 56a and returns to the illuminating system 100. Also, part of the S-polarized component Lsø which enters the second acting surface 56b of the polarizing beam splitter 56 is reflected at a right angle by the second acting surface 56b and enters the quarter wavelength optical phase plate 57 and therefore, is converted into P-polarized component by the quarter wavelength phase plate 57 and the reflecting plate 58, whereafter it enters the second acting surface 56b and is therefore transmitted through the second acting surface 56b and the first acting surface 56a and returns to the illuminating system 100. Accordingly, the polarizing beam splitter 56 of this polarizing apparatus 101 acts as an analyzer.

As described above, this projection type display apparatus converts the white parallel light beam emitted from the illuminating system 100 into a rectilinearly polarized light beam by the polarizing apparatus 101 and can therefore improve the utilization rate of light, and separates and combines the color light beams by the use of the cross dichroic prism 102 and therefore, the back focal length of the lens system 103 can be made remarkably smaller than in the conventional projection type display apparatus of this kind, and the degree of freedom of design of the projection lens 103 can be widened and the entire projection type display apparatus can be made compact. Further, the polarizing apparatus 101 can be made to act also as an analyzer.

Figure 7A:
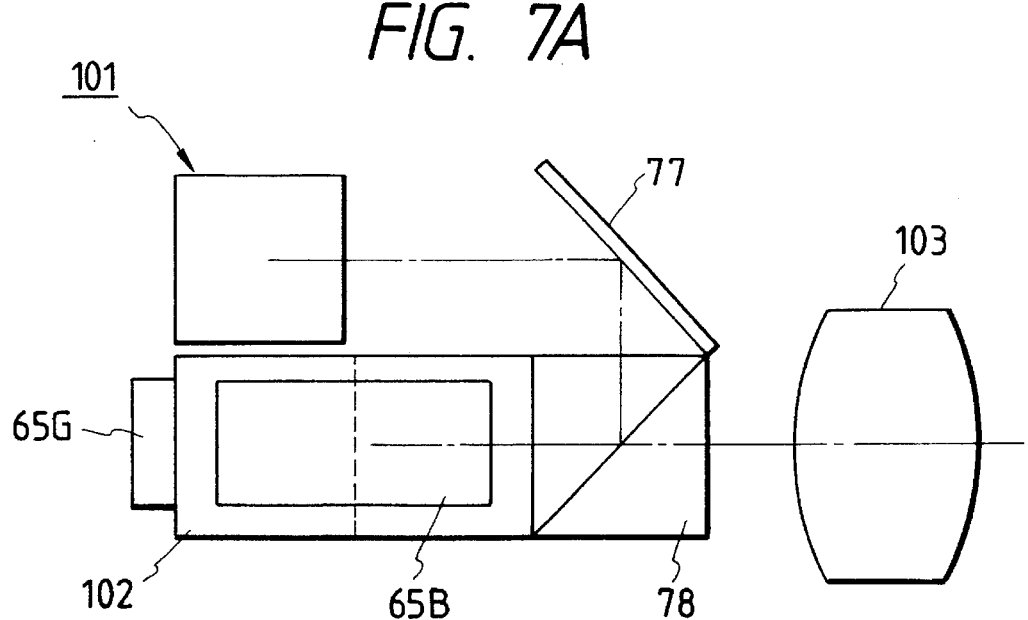
FIGS. 7A and 7B are a side view and a top plan view, respectively, showing the essential portions of an embodiment of a projection type display apparatus having the polarization illuminating apparatus shown in FIG. 1.
Figure 7B:
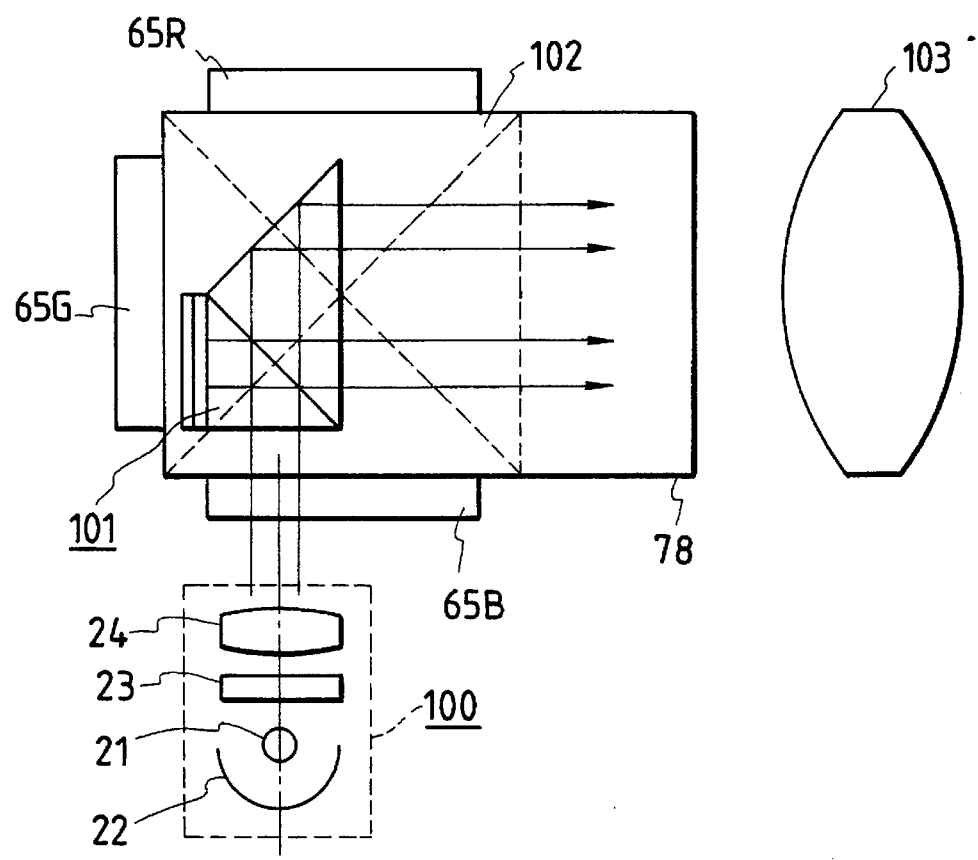

FIGS. 7A and 7B are a side view and a top plan view, respectively, showing the essential portions of an embodiment of the projection type display apparatus having the polarization illuminating apparatus shown in FIG. 1.

This projection type display apparatus has the already described illuminating system 100, the polarizing apparatus 101 shown in FIG. 1, a mirror 77 for reflecting the light beam emitted from the polarizing apparatus 101 downwardly at a right angle, a polarizing beam splitter 78 for reflecting the S-polarized component of the light beam reflected by the mirror 77 at a right angle toward the polarizing apparatus 101 and transmitting the P-polarized component of said light beam therethrough, a cross dichroic prism 102 having one side thereof adhesively secured to the emergence surface of the polarizing beam splitter 78 for said S-polarized component and having reflection type liquid crystal light valves 65R, 65G and 65B for red, green and blue, respectively, adhesively secured to the other three sides thereof, and a projection lens 113 provided on that side of the polarizing beam splitter 78 which is opposite to the cross dichroic prism 102.

The white parallel light beam emitted from the illuminating system 100 enters the polarizing apparatus 101 and as shown in FIG. 1, the P-polarized component of this white parallel light beam and the P-polarized component converted by the quarter wavelength optical phase plate 27 and the reflecting plate 28 emerge from the polarizing apparatus 101 to the mirror 77 (the P-polarized component and the converted P-polarized component together will hereinafter be referred to as the P-polarized light beam). The P-polarized light beam is totally reflected by the mirror 77 and enters the polarizing beam splitter 78. The plane of polarization of the P-polarized light beam becomes a plane of S-polarization relative to the acting surface of the polarizing beam splitter 78 and therefore, this P-polarized light beam is reflected by this acting surface and enters the cross dichroic prism 102. The P-polarized light beam which has entered the cross dichroic prism 102 behaves like the rectilinearly polarized light beam which has entered the cross dichroic prism 102 of the projection type display apparatus shown in FIG. 6, and enters the polarizing beam splitter 78 as reflected light modulated in the respective reflection type liquid crystal light valves 65R, 65G and 65B by an image signal. At this time, the polarizing beam splitter 78, like the polarizing apparatus 101 of FIG. 6, acts as an analyzer, and the component of said reflected light transmitted through the polarizing beam splitter 78 is projected onto a screen, not shown, through the projection lens system 103 and an image is formed on the screen.

As described above, again in the projection type display apparatus of the present embodiment, as in the apparatus shown in FIG. 6, the improved light utilization rate, the improved degree of freedom of design of the lens system 103 and the compactness of the entire construction can be achieved.

While the polarizing apparatus used in the present embodiment is one shown in FIG. 1, the polarizing apparatus shown in FIGS. 3 and 4 can of course be equally used.

FIG. 8 shows the construction of a further preferred embodiment of the present invention, and more particularly an apparatus for illuminating a liquid crystal light valves.

The difference of this polarization illuminating apparatus from that shown in FIG. 1 is that it comprises, instead of the reflecting mirror 22 and condenser lens 24 in FIG. 1, a rotational parabolic surface mirror 30 having a focus at or near the position of the light source 21 and a rotational parabolic surface mirror 31 forming a rotational parabolic shape also having a focus at or near the position of the light source 21 and located more adjacent to the emergence side than the mirror 30 and whose emergence opening has a shape and a size approximate to those of the opening defined by the light incidence surface I of the polarizing beam splitter 26, and the light beam from the illuminating system 100 is directed to the light incidence surface of the apparatus 101 without so much loss.

Generally, with the polarizing beam splitter 26, it is difficult to obtain a transmission factor of 100% for the P-polarized light to the acting surface 26a thereof, and particularly it is more difficult to maintain a high transmission factor for a very wide band like the visible wavelength band. Also, in the case of an incident light ray whose angle of incidence onto the acting surface 26a of the polarizing beam splitter 26 is off an optional angle, the transmission factor of the P-polarized component thereof to the acting surface 26a is reduced more remarkably. Accordingly, some P-polarized component mixes with the light beam ③ of the incident light ① in FIG. 8 which is reflected by the acting surface 26a. With regard also to a light beam ④ which reciprocally travels through the quarter wavelength optical phase plate 27, the amount of retardation thereof differs depending on wavelength and therefore, there is created a component whose direction of polarization does not completely rotate by 90°.

Further, when the light beam ④ is incident on the acting surface 26a of the polarizing beam splitter 26, some of the P-polarized component thereof is also reflected. That is, a light beam ④ returns toward the light source 21 due to the above-described three actions.

Again in the embodiment shown in FIG. 8, said lost light can be again utilized as effective light to thereby further enhance the light utilization rate.

That is, the light beam ⑥ which returns toward the light source in FIG. 8 is reflected by the reflecting mirror 30 and is condensed toward the light source 21 lying at the focus position of the mirror 30.

A light ray ⑦ transmitted through the light source 21 is again condensed at the focus position through the reflecting mirror 31 and the reflecting mirror 30, and further emerges again as a substantially parallel light beam to the polarizing beam splitter 26 through the reflecting mirror 30. Thus, in the present construction, it becomes possible that the light beam returned to the light source side emerges again as an effective parallel light beam (hereinafter referred to as the recurrent light beam). This recurrent light beam, like that shown in the first embodiment, emerges as polarized light from the light emergence surface O through the polarizing beam splitter 26, etc.

In the present embodiment, a parabolic mirror confocal to the reflecting mirror 30 is used as the reflecting mirror 31, but if instead, a mirror unit which causes the light beam returning from the polarizing beam splitter 26 to the light source to emerge again as an effective light beam through the position of the light source, such as an appropriate spherical mirror having its center at the focus position of the reflecting mirror, is added, there will be obtained a similar effect. Also, even a form in which the reflecting mirror 31 is eliminated could obtain a certain degree of effect.

FIG. 9 shows another embodiment in which an effective recurrent light beam is obtained, and more particularly an apparatus for illuminating a liquid crystal light valve. The differences of this embodiment from the embodiment shown in FIG. 8 lie in a semielliptical mirror 32 having a focus at or near the position of the light source 21 and whose emergence opening forms a rectangle or a shape approximate thereto, a plane mirror 33 partly overlapping with the semielliptical mirror 32 and located on the bisecting plane of the two focuses of a rotational elliptical member, and a condenser lens 34 having a focus at the position of the light source 21. Again in this embodiment, the light beam ⑥ returning from the polarizing beam splitter 26 to the light source 21 is reflected plural times about the position of the light source 21 by the mirrors 32 and 33 and emerges again as an effective recurrent light beam ⑦.

In the constructions shown in FIGS. 8 and 9 the emergence opening therein is formed into a rectangle or a shape approximate thereto, and of the light beam emitted from the light source 21, in the case of the embodiment shown in FIG. 1, at least part of the light beam emerging to the other portion of the rectangular light incidence surface I of the polarizing beam splitter 26 emerges as an effective light beam and also, the light beam returning from the polarizing beam splitter 26 to the light source 21 is effectively utilized as the recurrent light beam. The shape of the emergence opening need not always be made coincident with the shape of the incidence opening of the polarizing beam splitter 26, but may be such that the cross-sectional shape and size of the light beam travelling toward said incidence opening can be made substantially the same as or similar to those of the light incidence surface I.

Also, the means for obtaining the recurrent light beam as shown in FIGS. 8 and 9 attains a further effect particularly in the projection type display apparatus using the reflection type light valves as shown in FIGS. 7A and 7B. That is, of the light beams emerging from the reflection type light valves 65R, 65G and 65B in FIGS. 7A and 7B to the polarizing beam splitter 78, the reflected light beam consisting chiefly of S-polarized component enters the polarizing apparatus 101 as P-polarized component, and is converted into S-polarized and P-polarized components and returns to the illuminating system 100. In the present construction, it becomes possible to utilize this light beam again as an effective recurrent light beam.

In the embodiments described above, the polarizing apparatus 100 is provided with a polarizing beam splitter and a plane-of-polarization rotator comprising an arrangement of a quarter wavelength plate and a mirror, but the form of the polarizing apparatus is not restricted thereto. For example, the apparatus described in U.S. Pat. No. 4,560,999, U.S. Pat. No. 4,989,076, U.S. Pat. No. 4,864,390 and Japanese Laid-Open Patent Application No. 61-90584 mentioned under the "BACKGROUND OF THE INVENTION" and the illuminating system 100 can be combined together to assemble a polarization illuminating apparatus. By such a combination, the cross-sectional shape and size of the light beam from the illuminating system 100 can be made coincident with or similar to the shape (rectangular shape) and size of the light incidence surface of each of various polarizing apparatuses, thereby causing the light beam to efficiently enter each of the various polarizing apparatuses from the illuminating system 100. Of course, there is a similar effect in a case where the polarizing apparatus is a polarizing beam splitter or a polarizing plate.

Although projection type projections are shown by way of example in FIGS. 6 to 7B, the polarization illuminating apparatus of each of the above-described embodiments can also be applied to the transmission type projectors as shown in the above-mentioned publications, a flat display panel using a light valve, a printer using a light valve, or other optical apparatus utilizing a polarized beam than such a display instrument and such a recording instrument.

Where the illuminating system shown in FIG. 8 or 9 is used as the illuminating system 100, the light emergence opening of the system tends to become small and the angle of opening of the light beam directed from the system to the polarizing apparatus tends to become great, but if the apparatus shown in FIG. 1 is used as the polarizing apparatus, there will also be the advantage that even a non-parallel light beam having a relatively great angle of opening can be efficiently converted into polarized light. Accordingly, the polarization illuminating apparatuses of FIGS. 8 and 9 are very excellent.

Some other embodiments of the illuminating system will hereinafter be described. Of course, the illuminating systems hereinafter described are applicable to the apparatuses of the embodiments of FIGS. 1 to 9 and hitherto described modifications and examples of application.

A modification of the illuminating system of the present invention will first be described with reference to FIGS. 10 to 12.

This system is provided with a rotational parabolic surface mirror 30, a light source 21 provided near the forcus of the rotational parabolic surface mirror 30, and a spherical mirror 301 having a rectangular opening 331 (see FIG. 12) in the central portion thereof and disposed in opposed relationship with the rotational parabolic surface mirror 30 so that the center of curvature (the center of sphere) thereof may be lie near the light source 21.

Figure 11:
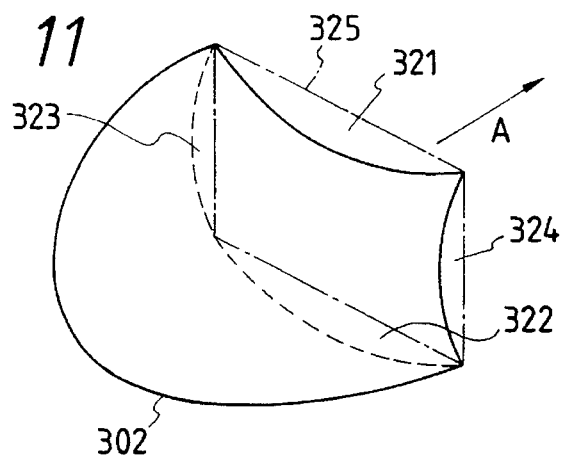
FIG. 11 is a perspective view of a rotatable parabolic surface mirror.

The rotational parabolic surface mirror 30, as shown in FIG. 11, has bow-shaped cut-away portions 321–324 formed in the upper surface, the lower surface and the opposite sides thereof so that when it is seen from on the optic axis A of parallel light passing through the central portion of the emergence surface thereof, the opening therein may become a rectangular opening 325. The shape of the cut-away portions 321–324 is the shape of the line of intersection between the rotational parabolic surface mirror 30 and a square post having a cross-section of the same size as the rectangular opening 325 when the square post is fitted to the rotational parabolic surface mirror 30, i.e., a bow-like shape.

Figure 12:
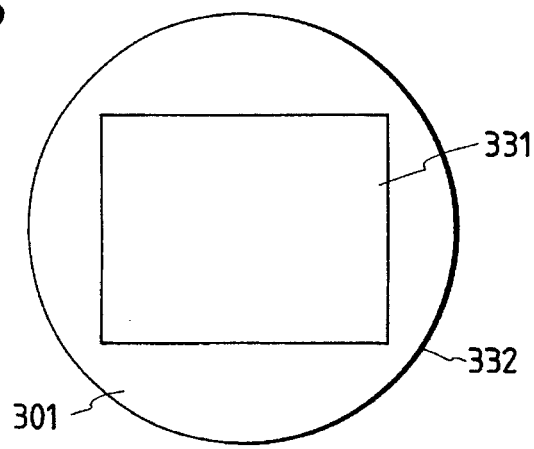
FIG. 12 is a front view of a spherical mirror.

Also, as shown in FIG. 12, the spherical mirror 301 has in the central portion thereof a rectangular opening 331 of the same size as the rectangular opening 325 in the rotational parabolic surface mirror 30, and has a circular opening 332 on the opposite side to the rectangular opening 331, and is disposed so that the circular opening 332 and the rectangular opening 325 in the rotational parabolic surface mirror 30 may be opposed to each other and the center of curvature thereof may coincide with the focus of the rotational parabolic surface mirror 30.

Figure 10A:
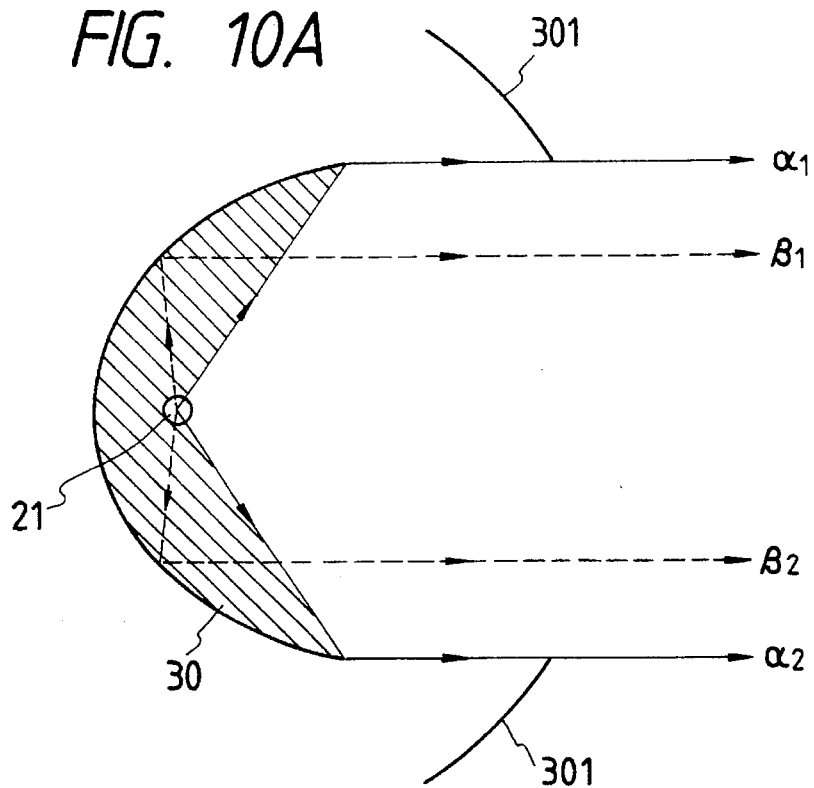
FIGS. 10A and 10B show the optical paths of light emitted from a light source in a further embodiment of the illuminating system of the present invention.

Accordingly, of light beams emitted from the light source 21 as indicated by hatching in FIG. 10A, the light beam travelling toward the rotational parabolic surface mirror 30 is reflected by the rotational parabolic surface mirror 30, as indicated, for example, by four light rays $\alpha_1$, $\alpha_2$, $\beta_1$ and $\beta_2$ whereafter it emerges as parallel light through the rectangular opening 325 in the rotational parabolic surface mirror 30 and the rectangular opening 331 in the spherical mirror 301. On the other hand, of light beams emitted from the light source 21 as indicated by hatching in FIG. 10B, the light beam travelling toward the four cut-away portions 321–324 of the rotational parabolic surface mirror 30 and more or less outwardly of the cut-away portions 321–324 is reflected toward the light source 21 by the spherical mirror 301 as indicated, for example, by four light rays $\gamma_1$, $\gamma_2$, $\delta_1$ and $\delta_2$, and part of this reflected light beam is intercepted or scattered by the light source 21, but the rest of the reflected light beam passes through the light source 21 and is reflected by the rotational parabolic surface mirror 30, whereafter it emerges as parallel light through the rectangular opening 325 in the rotational parabolic surface mirror 30 and the rectangular opening 331 in the spherical mirror 301.

Figure 10B:
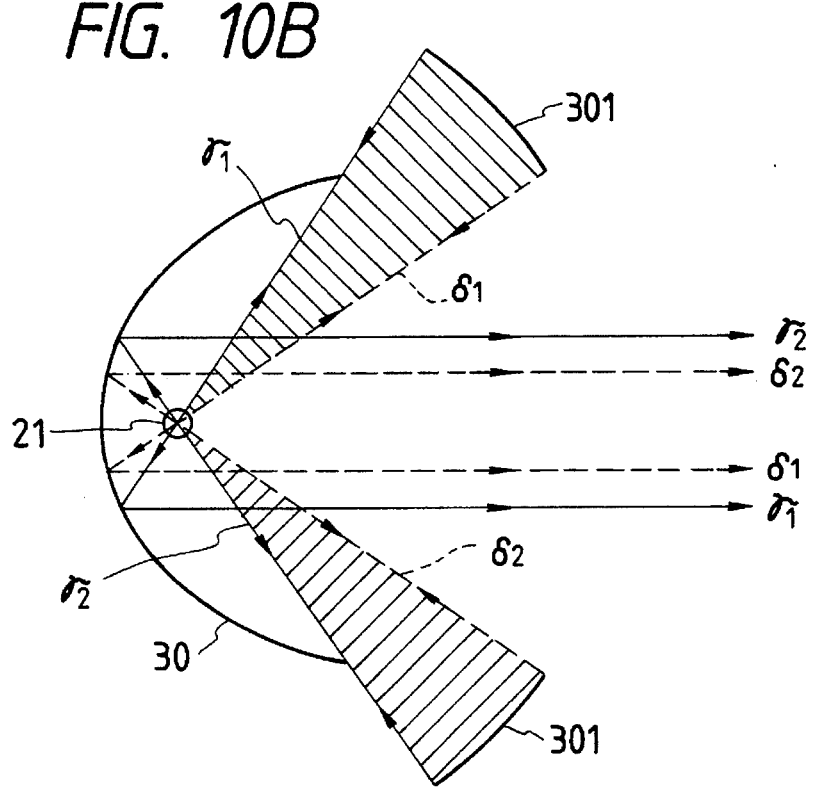

Accordingly, in the present embodiment, of the light beams emitted from the light source 21 indicated by hatching in FIG. 10B which were uneffective light beams in the prior art, the light beam travelling toward the four cut-away portions 321–324 of the rotational parabolic surface mirror 30 and more or less outwardly of the cut-away portions 321–324 can also be utilized as original illuminating light and therefore, the light utilization rate can be improved. Also, this light beam emerges as illuminating light by two reflections as previously described, and this leads to the advantage that reflection loss is small. Particularly, if as the light source 21, use is made of one having such a light distribution that almost all light enters the rotational parabolic surface mirror 30 and the spherical mirror 301, there will be obtained a rectangular illuminating light beam of very high light utilization rate.

Figure 13:
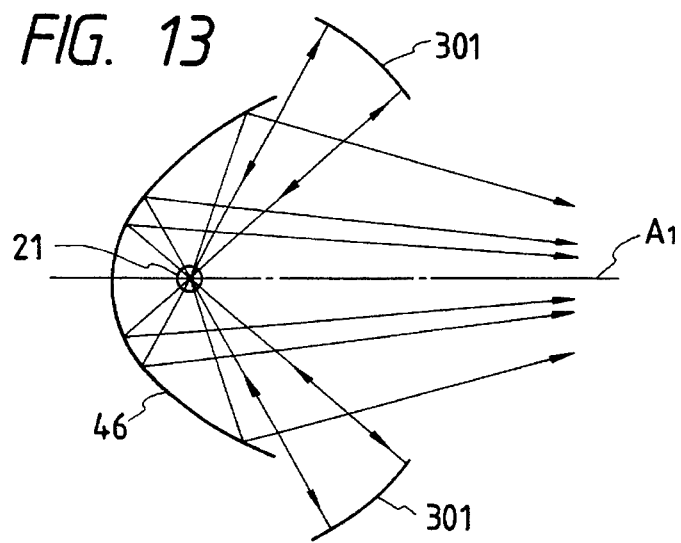
FIG. 13 is a schematic view showing another embodiment of the illuminating system of the present invention.

FIG. 13 is a schematic view showing a second modification of the illuminating system of the present invention.

This system is provided with a rotational elliptical mirror 46, a light source 21 provided near the first focus of the rotational elliptical mirror 46, and a spherical mirror 30 having a rectangular opening in the central portion thereof and disposed in opposed relationship with the rotational elliptical mirror 46 so that the center of curvature thereof may lie near the light source 21.

The rotational elliptical mirror 46 has bow-shaped cut-away portions formed on the upper surface, the lower surface and the opposite sides thereof so that the opening therein may be a rectangular opening when it is seen from on the optic axis A passing through the central portion of the emergence surface. The shape of these cut-away portions is the shape of the line of intersection between the rotational elliptical mirror 46 and a square post having a cross-section of the same size as a rectangular opening to be formed therein when the square post is fitted into a circular opening in the rotational elliptical mirror 46.

Also, the spherical mirror 301, like the spherical mirror 301 shown in FIG. 12, has in the central portion thereof a rectangular opening of the same size as the rectangular opening in the rotational elliptical mirror 46 and has a circular opening on the side opposite to said rectangular opening, and is disposed so that said circular opening and the rectangular opening in the rotational elliptical mirror 46 may be opposed to each other and the center of curvature thereof may coincide with the focus of the rotational elliptical mirror 46.

Again in the present embodiment, the light from the light source 21 can be made to efficiently emerge forwardly by the action of the spherical mirror 301. Since the rotational elliptical mirror 46 is used instead of the rotational parabolic surface mirror 30 shown in FIG. 10, the light beam reflected by the rotational elliptical mirror 46 becomes convergent light condensed toward the second focus position of the rotational elliptical mirror 46.

If the optical system is assembled so that this convergent light may be within the pupil (aperture stop) of the lens system 103 when the illuminating system of the present embodiment is used in lieu of the image display illuminating system 100 of the image display apparatus previously shown, the light utilization rate can be improved.

The illuminating system of FIG. 10 is not restricted to the aforedescribed embodiments, but the following embodiments thereof would occur to mind.

(1) The position of the light source 21 is somewhat deviated from the focus of the rotational parabolic surface mirror 30 or the focus of the rotational parabolic surface mirror 30 and the center of curvature of the spherical mirror 301 are somewhat deviated from each other, whereby the expanse, distribution characteristic, etc. of the light beam emerging from the rectangular opening 331 in the spherical mirror 301 can be adjusted more or less.

(2) The size of the rectangular opening 325 in the rotational parabolic surface mirror 30 and the size of the rectangular opening 331 in the spherical mirror 301 are made somewhat larger than the rectangular area to be illuminated, whereby the latitude by various deflections and tolerance can be widened.

For example, by the rectangular display area of the liquid crystal light valve of the already shown projector being directly or indirectly illuminated by these illuminating systems, the brightness of the image can be made greater than in the prior art.

Figure 14A:
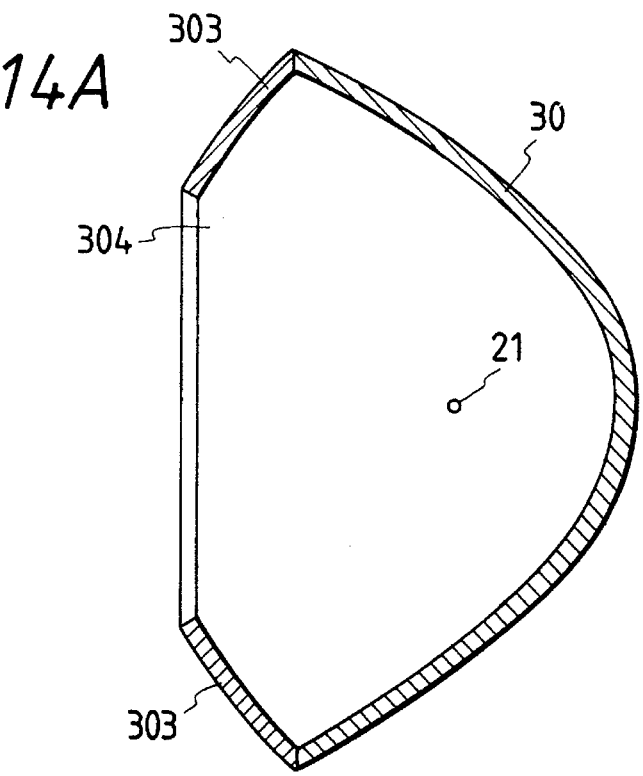
FIGS. 14A and 14B are a side cross-sectional view and a front view, respectively, showing another embodiment of the illuminating system of the present invention.
Figure 14B:
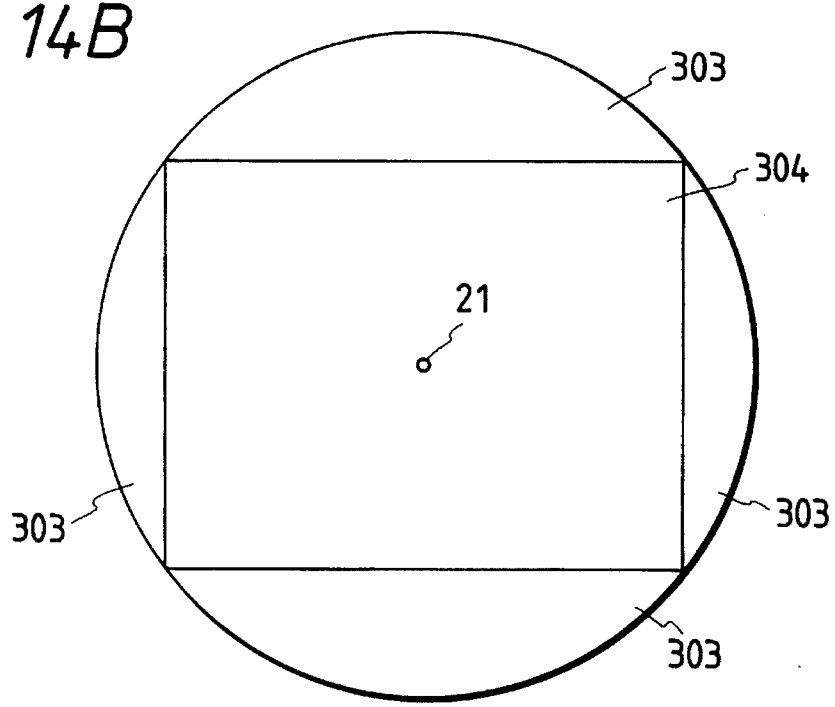

FIGS. 14A and 14B show another embodiment of the illuminating system of the present invention.

This illuminating system is provided with a first parabolic surface mirror 30 having a circular opening therein, a light source 21 disposed near the focus of the first parabolic surface mirror 30, and a second parabolic surface mirror 303 as a curved surface mirror having a rectangular opening 304 in the central portion thereof and having a circular opening of substantially the same diameter as the diameter of the opening in the first parabolic surface mirror 30 and a curvature smaller than the curvature of the first parabolic surface mirror 30, the focus of the second parabolic surface mirror 303 being made coincident with the focus of the first parabolic surface mirror 30, and the second parabolic surface mirror 303 and the first parabolic surface mirror 30 and joined together with the circular opening in the mirror 303 opposed to the circular opening in the mirror 30.

The route in this illuminating system along which the light emitted from the light source 21 emerges from the rectangular opening 304 in the second parabolic surface mirror 303 will now be described with reference to FIGS. 15A–15D. In the following, description will be made only of the route of the light which is emitted from the light source 21 to the upper half of FIG. 15. (The route of the light emitted to the lower half of FIG. 15 is similar).

(1) Light directly emitted

Figure 15A:
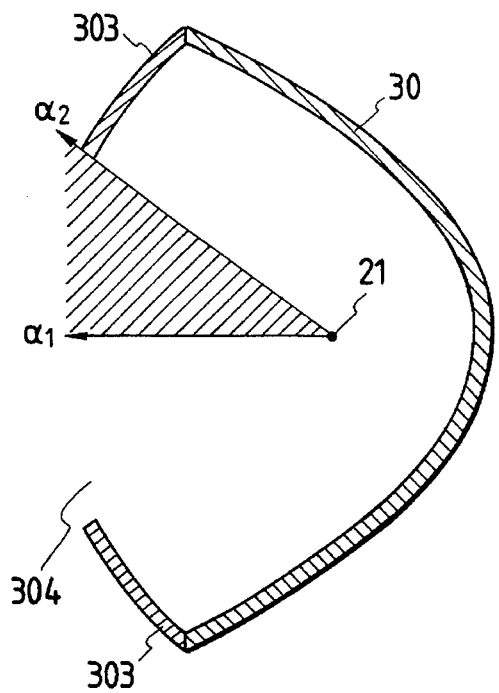
FIG. 15A shows the optical path of light directly emitted from a light source.

Of the light emitted from the light source 21, the light emitted within the range indicated by hatching surrounded by the light rays $\alpha_1$ and $\alpha_2$ of FIG. 15A is emitted toward the rectangular opening 304 in the second parabolic surface mirror 303 and intactly emerges as direct light.

(2) Light emitted by five times of reflection

Figure 15B:
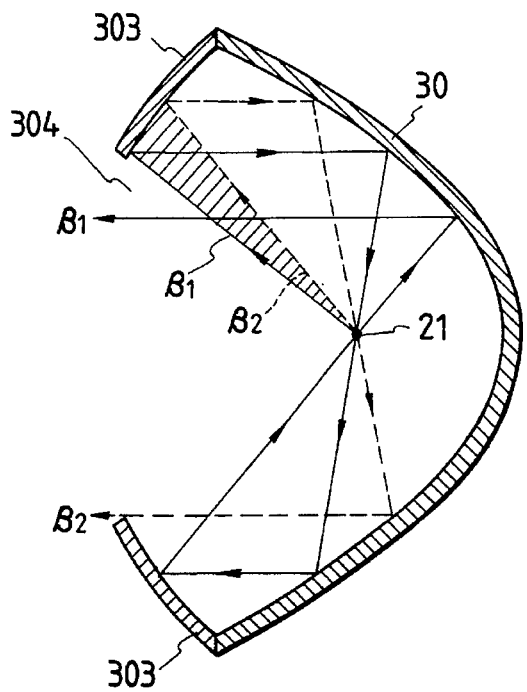
FIG. 15B shows the optical path of light emitted by five reflections.

The light indicated by a light ray $\beta_1$ in FIG. 15B which is emitted from the light source 21 toward the upper end portion of the rectangular opening 304 in the second parabolic surface mirror 303 is reflected as parallel light toward the first parabolic surface mirror 30 by the second parabolic surface mirror 303 because the focus of the second parabolic surface mirror 303 is made coincident with the focus of the first parabolic surface mirror 30 and the light source 21 is disposed near said focuses, whereafter it is reflected toward the light source 21 by the first parabolic surface mirror 30. Some of this reflected light is intercepted or scattered by the light source 21, while the rest of it passes through the light source 21 and is again reflected as parallel light toward the second parabolic surface mirror 303 by the first parabolic surface mirror 30, and thereafter is reflected toward the light source 21 by the second parabolic surface mirror 303. This reflected light, except some of it, passes through the light source 21 again and is reflected by the first parabolic surface mirror 30, and thereafter emerges as parallel light from the rectangular opening 304 in the second parabolic surface mirror 303. Accordingly, the light indicated by the light ray $\beta_1$ is reflected two times by the second parabolic surface mirror 303 and three times by the first parabolic surface mirror 2, thus five times in total, whereafter it emerges from the rectangular opening 304 in the second parabolic surface mirror 303.

Of the light emitted from the light source 21, the light emitted within the range indicated by hatching surrounded by the light rays $\beta_1$ and $\beta_2$ of FIG. 15B is reflected five times in the same manner, whereafter it emerges as parallel light from the rectangular opening 304 in the second parabolic surface mirror 303.

(3) Light emitted by three times of reflection

Figure 15C:
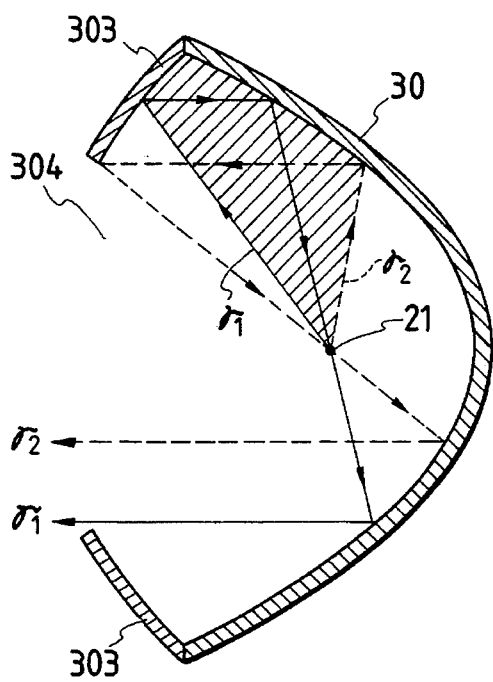
FIG. 15C shows the optical path of light emitted by three reflections.

Light indicated by a light ray $\gamma_1$ in FIG. 15C is reflected as parallel light toward the first parabolic surface mirror 30 by the second parabolic surface mirror 303 for the same reason as that set forth in item (2) above, and thereafter is reflected toward the light source 21 by the first parabolic surface mirror 30. This reflected light, except some of it, passes through the light source 21 and is again reflected as parallel light by the first parabolic surface mirror 30, and thereafter emerges from the rectangular opening 304 in the second parabolic surface mirror 303. Accordingly, the light indicated by the light ray $\gamma_1$ is reflected once by the second parabolic surface mirror 303 and twice by the first parabolic surface mirror 30, thus three times in total; and thereafter emerges from the rectangular opening 304 in the second parabolic surface mirror 30.

Also, light indicated by a light ray $\gamma_2$ in FIG. 15C is reflected as parallel light toward the second parabolic surface mirror 303 by the first parabolic surface mirror 30, and thereafter is reflected toward the light source 21 by the second parabolic surface mirror 303. This reflected light, except some of it, passes through the light source 21 and is again reflected as parallel light by the first parabolic surface mirror 30, and thereafter emerges from the rectangular opening 304 in the second parabolic surface mirror 303. Accordingly, the light indicated by the light ray $\gamma_2$ is also reflected once by the second parabolic surface mirror 303 and twice by the first parabolic surface mirror 30, thus three times in total, and thereafter emerges from the rectangular opening 304 in the second parabolic surface mirror 303.

Of the light emitted from the light source 21, the light emitted within the range indicated by hatching surrounded by the light ray $\gamma_1$ and $\gamma_2$ of FIG. 15C is reflected three times in the same manner, and thereafter emerges from the rectangular opening 304 in the second parabolic surface mirror 303.

(4) Light emitted by one time of reflection

Figure 15D:
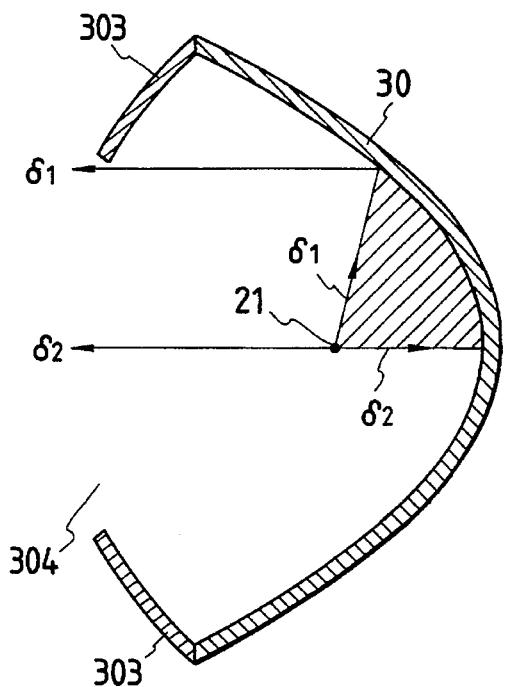
FIG. 15D shows the optical path of light emitted by one reflection.

Light indicated by a light ray $\delta_1$ in FIG. 15D is reflected as parallel light by the first parabolic surface mirror 30 for the same reason as that set forth in item (2) above, and thereafter emerges as parallel light from the rectangular opening 304 in the second parabolic surface mirror 302.

Of the light emitted from the light source 21, the light emitted within the range indicated by hatching surrounded by the light rays $\delta_1$ and $\delta_2$ of FIG. 15D is reflected once in the same manner, and thereafter emerges from the rectangular opening 304 in the second parabolic surface mirror 303.

As the result, the light emitted from the light source 21, except for the interception and scattering when this light passes through the light source 21 and the loss when this light is reflected by the first and second parabolic surface mirrors 30 and 303, emerges from the rectangular opening 304 in the second parabolic surface mirror 303 and the range of application of this emitted light becomes a rectangle and therefore, almost all of the light emitted from the light source 21 can be applied to the rectangular display area of a liquid crystal light valve, not shown, and the light incidence surface I of the polarizing apparatus 101 through a condenser lens, not shown. Particularly, by providing the second parabolic surface mirror 303, the light emitted from the light source through the vicinity of the end of the opening in the parabolic surface mirror which was heretofore not utilized at all can also be made to emerge as parallel light from the rectangular opening 304 in the second parabolic surface mirror 303 and be applied to the rectangular display area of the liquid crystal light valve, not shown, and the light incidence surface I of the polarizing apparatus 101 and therefore, the light utilization rate can be improved.

The relation between the curvature of the first parabolic surface mirror 30 and the curvature of the second parabolic surface mirror 304 will now be described with reference to FIG. 16.

Consider the longitudinal cross-section with the aspect ratio of the display area of the liquid crystal light valve or the light incidence surface I of the polarizing apparatus 101 being 3:4.

Figure 16:
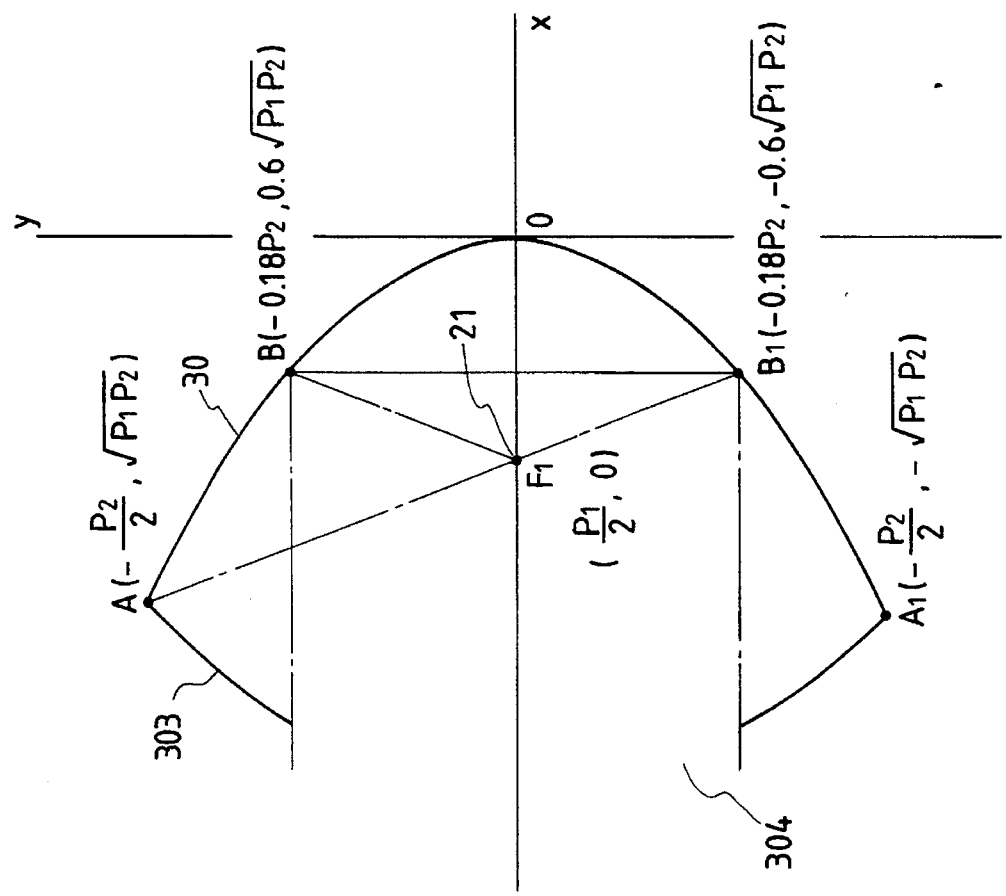
FIG. 16 illustrates the relation between the curvature of a first parabolic surface mirror and the curvature of a second parabolic surface mirror.

When as shown in FIG. 16, the vertex of the first parabolic surface mirror 30 is the origin, if the first parabolic surface mirror 30 is expressed as $$y^2 = -2p_1 x (P_1 > 0), \qquad (1)$$

the curvature of the first parabolic surface mirror 30 can be represented by $1/P_1$ and the coordinates of the focus F of the first parabolic surface mirror 30 can be represented by $(P_1/2, 0)$.

Also, the second parabolic surface mirror 303 is joined with the focus thereof made coincident with the focus of the first parabolic surface mirror 30 and with the circular opening therein and the circular opening in the first parabolic surface mirror 30 opposed to each other and therefore, is represented by $$y^2 = 2P_2 \{x + \tfrac{1}{2}(P_1 + P_2)\} (P_2 > 0) \qquad (2)$$

and the curvature thereof is $1/P_2$.

From equations (1) and (2), the coordinates of the upper and lower junctions A and $A_1$ of the first and second parabolic surface mirrors 30 and 303 are:

$$A\left( -\frac{P_2}{2}, (P_1 P_2)^{1/2} \right)$$

$$A_1\left( -\frac{P_2}{2}, -(P_1 P_2)^{1/2} \right)$$

Also, the ratio of the length (diameter) of the circular opening in the first parabolic surface mirror 30 to the longitudinal length of the rectangular opening 304 in the second parabolic surface mirror 303 is 5:3 (see FIG. 16) and therefore, the coordinates of two points B and $B_1$ on the first parabolic surface mirror 30 at which the upper and lower ends of the rectangular opening 304 are equal to the y-axis are:

$B(-0.18\ P_2,\ 0.6 \cdot (P_1 P_2)^{1/2})$ $B_1(-0.18\ P_2,\ -0.6 \cdot (P_1 P_2)^{1/2})$ Accordingly, in order that all of the light emitted from the light source 21 installed at the focus F may be made to emerge from the rectangular opening 304 in the second parabolic surface mirror 303 by five or less times of reflection as shown in FIG. 15, the focus F and the point $B_1$ must be on the same line and therefore, from the fact that the inclinations of the straight line linking the junction A and the focus F together and the straight line linking the focus F and the point $B_1$ together are equal, $$\frac{1}{P_2} = 0.6 \cdot \frac{1}{P_1} \tag{3}$$

can be found.

From equation (3), it will be seen that in this case, the curvature $(1/P_2)$ of the second parabolic surface mirror 303 can be set to 0.6 time the curvature $(1/P_1)$ of the first parabolic surface mirror 30.

With regard also to the lateral cross-section of the object to be illuminated such as the liquid crystal light valve, with it taken into account that the ratio of the length (diameter) of the circular opening in the first parabolic surface mirror 30 to the lateral length of the rectangular opening 304 in the second parabolic surface mirror 303 is 5:4 (see FIG. 16), the curvature $(1/P_3)$ of the second parabolic surface mirror 303 for all of the light emitted from the light source 21 to be caused to emerge from the rectangular opening 304 in the second parabolic surface mirror 303 by five or less times of reflection can be found as follows:

$$\frac{1}{P_3} = 0.8 \cdot \frac{1}{P_1} \tag{4}$$

and can be set to 0.8 time the curvature $(1/P_1)$ of the first parabolic surface mirror 30.

The point which should be noted here is that if the curvature $(1/P_1)$ of the first parabolic surface mirror 30 and the curvature $(1/P_2, 1/P_3)$ of the second parabolic surface mirror 303 are made equal to each other, the light emitted from the light source 21 installed at the focus position toward the first parabolic surface mirror 30 or the second parabolic surface mirror 303 always passes along the same optical path and is reflected between these two parabolic surface mirrors and therefore does not emerge from the rectangular opening 304 in the second parabolic surface mirror 303. Accordingly, to cause such light to emerge from the rectangular opening 304 in the second parabolic surface mirror 303 after several times of reflection, it is necessary to make the curvature $(1/P_2, 1/P_3)$ of the second parabolic surface mirror 303 smaller than the curvature $(1/P_1)$ of the first parabolic surface mirror 30.

The curvature $(1/P_4)$ of the second parabolic surface mirror 303 in the longitudinal direction of the object to be illuminated such as the liquid crystal light valve for causing all of the light emitted from the light source 21 to emerge from the rectangular opening 304 in the second parabolic surface mirror 303 by three or less times of reflection is found to be $$\frac{1}{P_4} = 0.36 \cdot \frac{1}{P_1} \tag{5}$$

because at this time, the point B shown in FIG. 16, the focus F and the point $B_1$ are on the same line and therefore the inclination of the straight line linking the point B and the focus F together and the inclination of the straight line linking the focus F and the point $B_1$ together are equal to each other, and it will be seen that the curvature $(1/P_4)$ of the second parabolic surface mirror 303 can be set to 0.36 time the curvature $(1/P_1)$ of the first parabolic surface mirror 30.

Likewise, it will be seen that the curvature $(1/P_5)$ of the second parabolic surface mirror 303 in the lateral direction of the object to be illuminated such as the liquid crystal light valve at this time can be set to 0.64 time the curvature $(1/P_1)$ of the first parabolic surface mirror 303.

Figure 17:
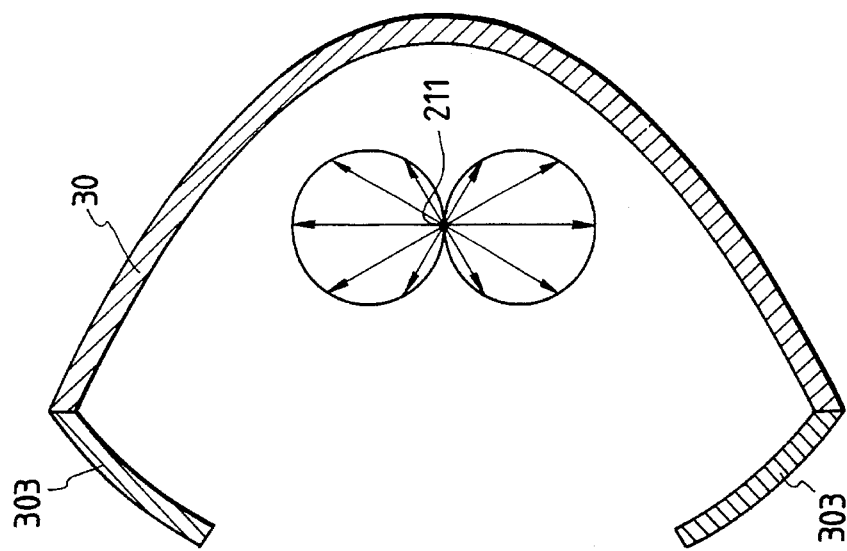
FIG. 17 shows another embodiment of the illuminating system of the present invention constructed by the use of a light source having a light emission angle distribution in the form of an Arabic numeral 8.

In the embodiment described above, the second parabolic surface mirror 303 having the rectangular opening 304 formed in the central portion thereof and having a circular opening of the same size as that in the first parabolic surface mirror 30 and a curvature smaller than the curvature of the first parabolic surface mirror 30 is joined to the first parabolic surface mirror with the focus thereof made coincident with the focus of the first parabolic surface mirror 30 and with the circular opening therein opposed to the circular opening in the first parabolic surface mirror 30. However, the use of a spherical mirror having a rectangular opening in the central portion thereof and having a circular opening of the same size as that in the first parabolic surface mirror 30 and a curvature smaller than the curvature $(1/P_1)$ of the first parabolic surface mirror 30 can also cause the light which could heretofore not be utilized to be reflected several times between the spherical mirror and the first parabolic surface mirror 30 and thereafter emerge from said rectangular opening and can attain a similar effect by joining the spherical mirror to the first parabolic surface mirror 30 with the circular opening in the spherical mirror opposed to the circular opening in the first parabolic surface mirror 30. Also, the deterioration of aberrations when the spherical mirror is used is of the same degree as that when the parabolic surface mirror is used and therefore, when the ease of manufacture is taken into consideration, the use of the spherical mirror leads to the low cost of the illuminating system. Where as the light source 21, use is made of a light source having a light emission angle distribution in the form of an Arabic numeral 8 shown in FIG. 17, this light source can be installed so that the direction of light emission in which the light emission angle distribution is 0 may be perpendicular to the irradiating surface of the liquid crystal light valve or the polarizing apparatus, thereby reducing the proportion of the direct light emitted directly from the light source toward the object to be illuminated such as the liquid crystal light valve, and almost all light is reflected by the first and second parabolic surface mirrors and emerges as parallel light to the object to be illuminated such as the liquid crystal light valve and thus, the condenser lens will become unnecessary.

Figure 18:
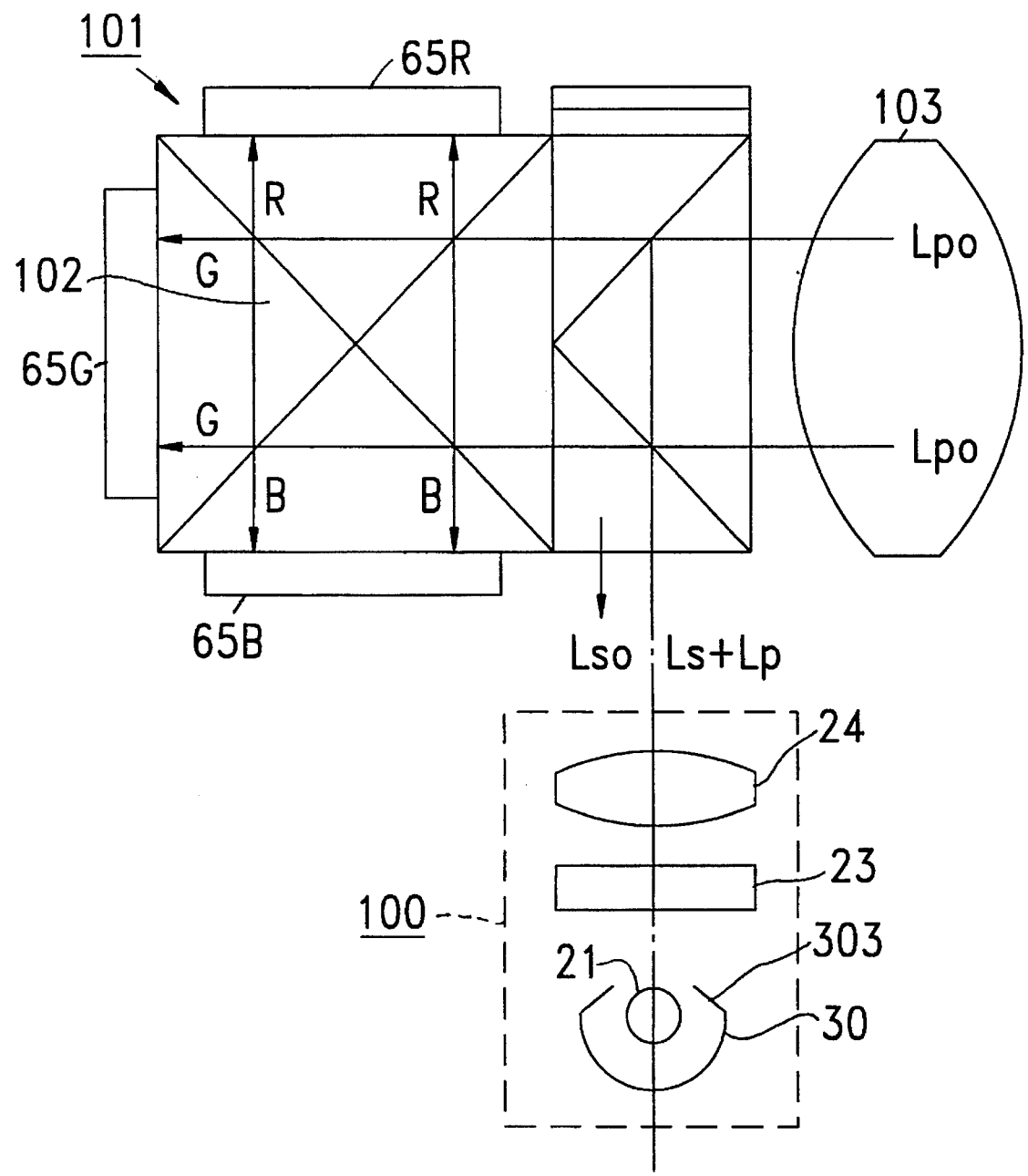
FIG. 18 shows the construction of a projection type display apparatus similar to that shown in FIG. 6 and includes the parabolic surface mirror of FIG. 14.

FIG. 18 shows the construction of a projection type display apparatus similar to that shown in FIG. 6 and includes the parabolic surface mirror 303 of FIG. 14.

The second parabolic surface mirror and the spherical mirror need not always be joined to the first parabolic surface mirror. Also, the size of the openings in the second parabolic surface mirror and the spherical mirror which are adjacent to the first parabolic surface mirror may be more or less larger than the size of the opening in the first parabolic surface mirror. Further, where the spherical mirror is used, the center of curvature of the spherical mirror and the focus of the first parabolic surface mirror may be made substantially coincident with each other.

By directly or indirectly illuminating, for example, the rectangular display area of the liquid crystal light bulb of the already shown projector by one of these illuminating systems, the brightness of image can be made higher than in the prior art.

We claim:

1. An illumination apparatus comprising:

an optical system having a rectangular incident surface for converting non-polarized light to polarized light;

a mirror having a substantially rotation-symmetrical reflection surface for reflecting light from a light source toward said rectangular incident surface of said optical system, said mirror including a rectangular opening facing said optical system for making the light from said light source pass therethrough as light beam which cross-sectional portion is substantially rectangularly shaped;

wherein said optical system comprises a polarization light beam splitter for splitting said non-polarized light into a first polarized light and a second polarized light which polarization directions are mutually intersected and means for changing a polarization state of said first polarized light so that an illumination-objected surface is illuminated by said first second polarized lights in which the polarization directions thereof are mutually consistent.

2. An illumination apparatus comprising a rectangular image generating means for generating an image by modulating said first and second polarized light from the illumination apparatus according to claim 1.

3. An illumination apparatus according to claim 1, wherein said polarization beam splitter splits said first and second polarized light as a reflected light and a transmitted light thereby to be directed toward mutually intersected directions and said optical system includes a folding mirror in order that said second polarized light transmitted through said polarization beam splitter is reflected such that an optical path of said second polarized light is folded by 90° whereby the folded optical path is made to be parallel to the optical path of said first polarized light reflected by said polarization light beam splitter.

4. An illumination apparatus according to claim 3 wherein said folding mirror includes a first reflection surface for reflecting light from said light source toward said opening and a second reflection surface for reflecting the light emitted from said light source toward outside of said opening so as to be directed to said light source.

5. An illumination apparatus comprising a rectangular image generating means for generating an image by modulating said first and second polarized light from the illumination apparatus according to claims 3 or 4.

6. An illumination apparatus according to claim 1, wherein said polarization light beam splitter system splits said first and said second polarized light as a reflected light and a transmitted light to be directed toward mutually intersected directions, and said optical system includes a second polarization beam splitter having construction in which the end portion of said second polarization beam splitter and that of said polarization light beam splitter are disposed so as to be mutually abutted whereby a roof-shaped portion is formed thereby wherein said second polarization light beam splitter first transmits said second polarized light through said polarization light beam splitter after the polarization plane is rotated by said means for changing a polarization state of said first polarized light toward a direction parallel to an optical path of said first polarized light.

7. An illumination apparatus according to claim 6, wherein said mirror includes a first reflection surface for reflecting light from said light source toward said opening and a second reflection surface for reflecting the light emitted from said light source toward outside of said opening so as to be directed to said light source.

8. An illumination apparatus comprising a rectangular image generating means for generating an image generated by modulating said first and second polarized light from the illumination apparatus according to claims 6 or 7.

* * * * *

UNITED STATES PATENT AND TRADEMARK OFFICE
CERTIFICATE OF CORRECTION

PATENT NO.  : 5,461,500
DATED       : October 24, 1995
INVENTOR(S) : Sadahiko Tsuji et al It is certified that error appears in the above-indentified patent and that said Letters Patent is hereby corrected as shown below:

Title page, item [56]

REFERENCES CITED

U.S. PATENT DOCUMENTS

In 4,334,734   6/1982   Harene et al. .................. 359/70, "Harene et al." should read -- Hareng et al. --

In Column 1, line 23, after "4,864,390," and before "Japanese", insert -- and --
In Column 1, line 33, "light-from" should read -- light from --
In Column 3, line 15, "bulbs," should read -- valves, --
In Column 5, line 41, "Splitter" should read -- splitter --
In Column 6, line 20, after "embodiments." begin a new paragraph with -- FIG. 3 --
In Column 8, line 8, "rectilinarly" should read -- rectilinearly --
In Column 8, line 29, delete "an image", second occurrence
In Column 9, line 54, "valves." should read -- valve. --
In Column 10, line 23, " 4 " should read -- 6 --
In Column 10, line 60, "forcus" should read -- focus --
In Column 12, line 15, "forcus" should read -- focus --

UNITED STATES PATENT AND TRADEMARK OFFICE
CERTIFICATE OF CORRECTION

PATENT NO. : 5,461,500
DATED : October 24, 1995
INVENTOR(S) : Sadahiko Tsuji et al It is certified that error appears in the above-indentified patent and that said Letters Patent is hereby corrected as shown below:

In Column 12, line 21, delete "be"
In Column 16, line 30, Equation (1), "$y^2=-2p_1x(P_1 > 0)$," should read
-- $y^2 = -2P_1x (P_1 > 0)$, --
In Column 16, line 50, " $(P_1P_2)^{1/2}$ " should read -- $(P_1P_2)^{1/4}$ --
In Column 16, line 54, " $(P_1P_2)^{1/2}$ " should read -- $(P_1P_2)^{1/4}$ --
In Column 18, line 61, "bulb" should read -- valve --

In Claim 1, column 19, line 18, after "first" and before "second" insert -- and --
In Claim 4, column 19, line 37, after "claim 3" insert a comma Signed and Sealed this Ninth Day of April, 1996

Attest:

BRUCE LEHMAN

Attesting Officer

Commissioner of Patents and Trademarks